(12) United States Patent
Joergensen

(10) Patent No.: US 6,511,346 B2
(45) Date of Patent: Jan. 28, 2003

(54) PLUG CONNECTION FOR A COFFEE MAKING APPARATUS

(75) Inventor: Carsten Joergensen, St. Niklausen (CH)

(73) Assignee: PI-Design AG, Triengen (CH)

( * ) Notice: Subject to any disclaimer, the term of this patent is extended or adjusted under 35 U.S.C. 154(b) by 0 days.

(21) Appl. No.: 09/736,175

(22) Filed: Dec. 15, 2000

(65) Prior Publication Data

US 2001/0004562 A1 Jun. 21, 2001

(30) Foreign Application Priority Data

Dec. 16, 1999 (DK) .......................................... 1999 1805

(51) Int. Cl.$^7$ .............................................. H01R 13/73
(52) U.S. Cl. ................... 439/546; 439/332; 248/346.03
(58) Field of Search .................................. 439/332, 545, 439/544, 546, 675, 543, 549; 248/346.03, 500

(56) References Cited

U.S. PATENT DOCUMENTS

| | | | | |
|---|---|---|---|---|
| 4,003,618 A | * | 1/1977 | Booty | ......................... 439/22 |
| 4,643,381 A | * | 2/1987 | Levy | ........................... 248/154 |
| 4,725,714 A | * | 2/1988 | Naya et al. | .................. 219/308 |
| 5,041,102 A | * | 8/1991 | Steer et al. | .................. 604/338 |

* cited by examiner

Primary Examiner—Renee Luebke
Assistant Examiner—Phuong Nguyen
(74) Attorney, Agent, or Firm—Nath & Associates PLLC; Gary M. Nath; Marvin C. Berkowitz

(57) ABSTRACT

A plug for a power consumer is positioned centrally in a recess in a bottom of the power consumer and rests in a flange at an edge of the recess. The plug has a first portion and a second portion that can be rotated relative to each other about a common axis perpendicular to the bottom. The first portion of the plug has a plurality of fish plates extending outwardly from its sides, each fish plate having a recess. The second portion has a plurality of hooks, each having a protuberance. By rotation of the second portion relative to the first portion the protuberance of each hook is engaged in the recess of the respective corresponding fish plate.

5 Claims, 3 Drawing Sheets

PLUG CONNECTION FOR A COFFEE MAKING APPARATUS

FIELD OF THE INVENTION

This invention relates to a plug for a power consuming apparatus, in particular a coffee-making apparatus, and means for fastening such a plug in the power consuming apparatus.

BACKGROUND OF THE INVENTION

Such plugs are often used in cordless kettles, where they are fitted to a bottom of the kettle, so that they can be joined with a corresponding part in a base which constitutes an electrical connection to a power supply circuit.

However, such plugs have several drawbacks, as they are generally laborious to mount. Their mounting requires the use of special tools and takes a significant amount of time.

SUMMARY OF THE INVENTION

Consequently, an object of the present invention is to provide a plug of the type mentioned above for which mounting and assembly thereof are simple and can be carried out without the use of tools, and in a relatively short time. It is a further object that it be possible to use the same method of assembly for the base, where the counterpart of the plug is to be fitted.

According to the present invention, a plug of the type mentioned in the introduction is positioned centrally in a recess in the bottom of the power consuming apparatus and rests in a flange at the edge of the recess, thus allowing rotation around an axis perpendicular to the bottom. The plug comprises a number of fish plates which, by rotating the plug, can be led in under a corresponding number of hooks which, from a position inside the bottom of the power consuming apparatus, are available for fastening and locking the fish plates.

It is possible to fit the plug in accordance with the present invention to the bottom of the power consuming apparatus by a simple turning movement, without the use of tools and in a very short time. This means that assembly of plugs according to the present invention is suitable for robotic assembly, thereby lowering the production cost.

In an advantageous embodiment of the plug according to the principles of the present invention, a spring-like lock can be used between the fish plates and hooks. Further advantageous features of the invention are presented in the dependent claims.

BRIEF DESCRIPTION OF THE DRAWINGS

The drawings depict an embodiment according to the principles of the present invention. In these drawings.

DETAILED DESCRIPTION OF A PREFERRED EMBODIMENT

Figure 1:
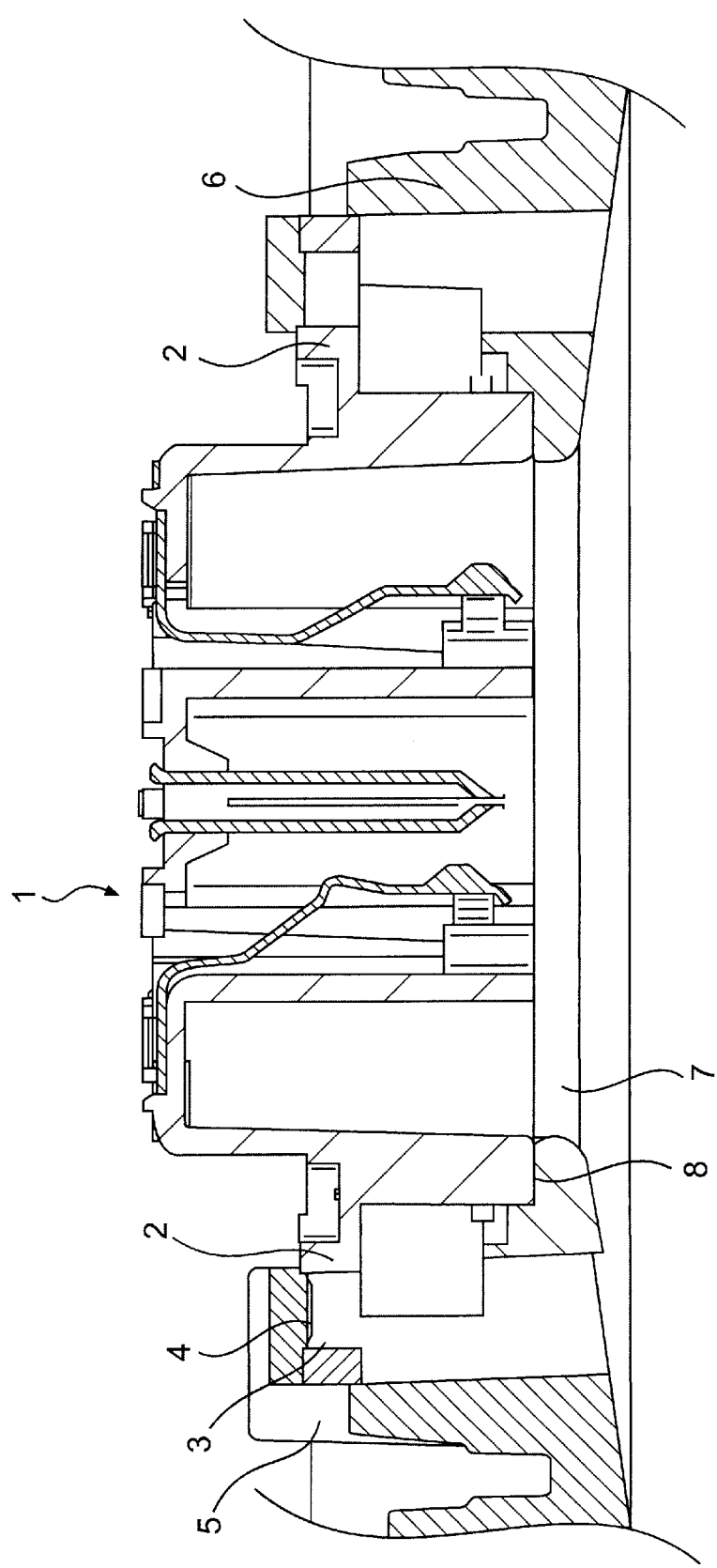
FIG. 1 depicts a cross-sectional view of a plug according to the principles of the present invention.
Figure 2:
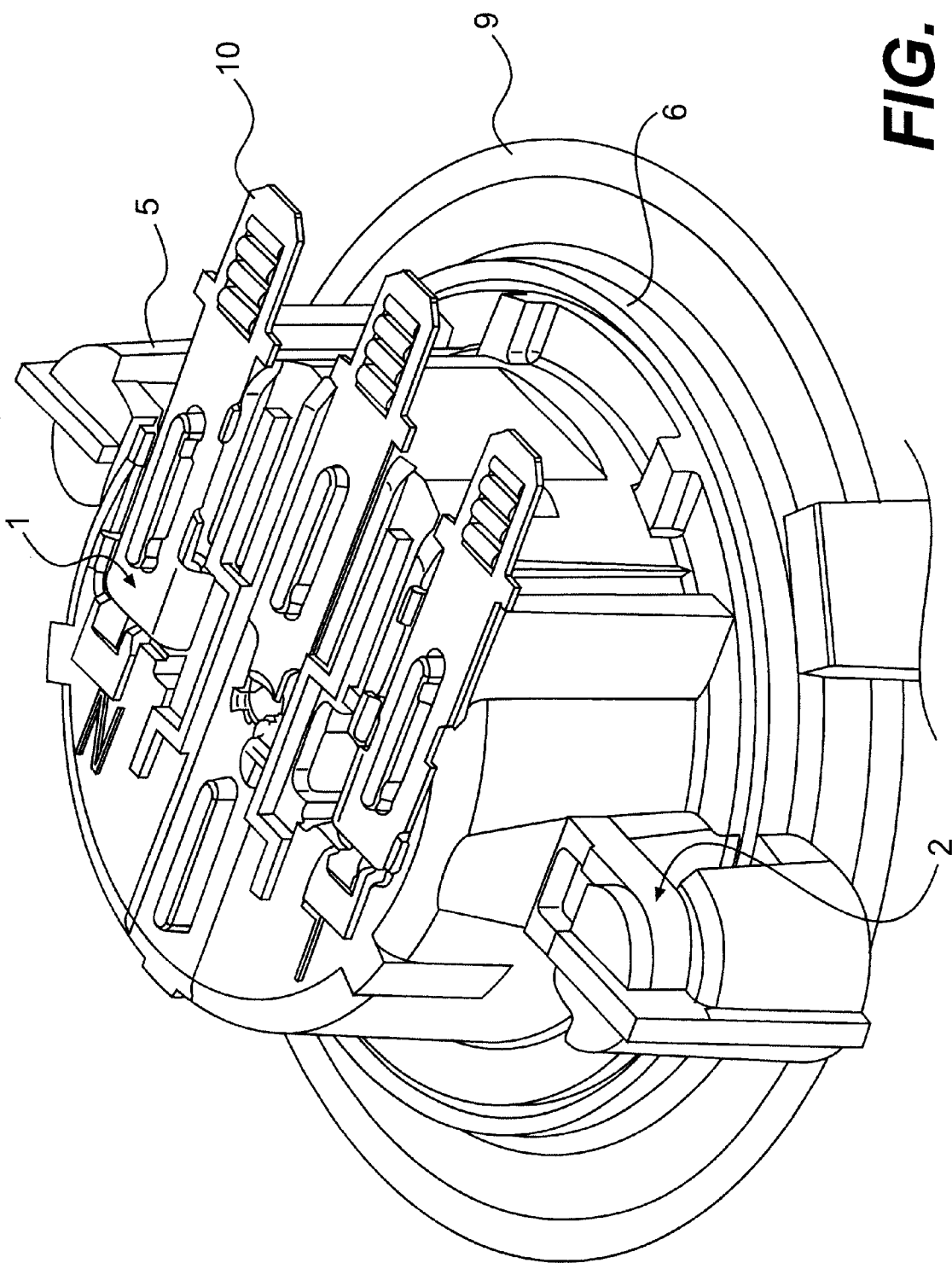
FIG. 2 shows a perspective view of the plug according to the principles of the present invention.
Figure 2A:
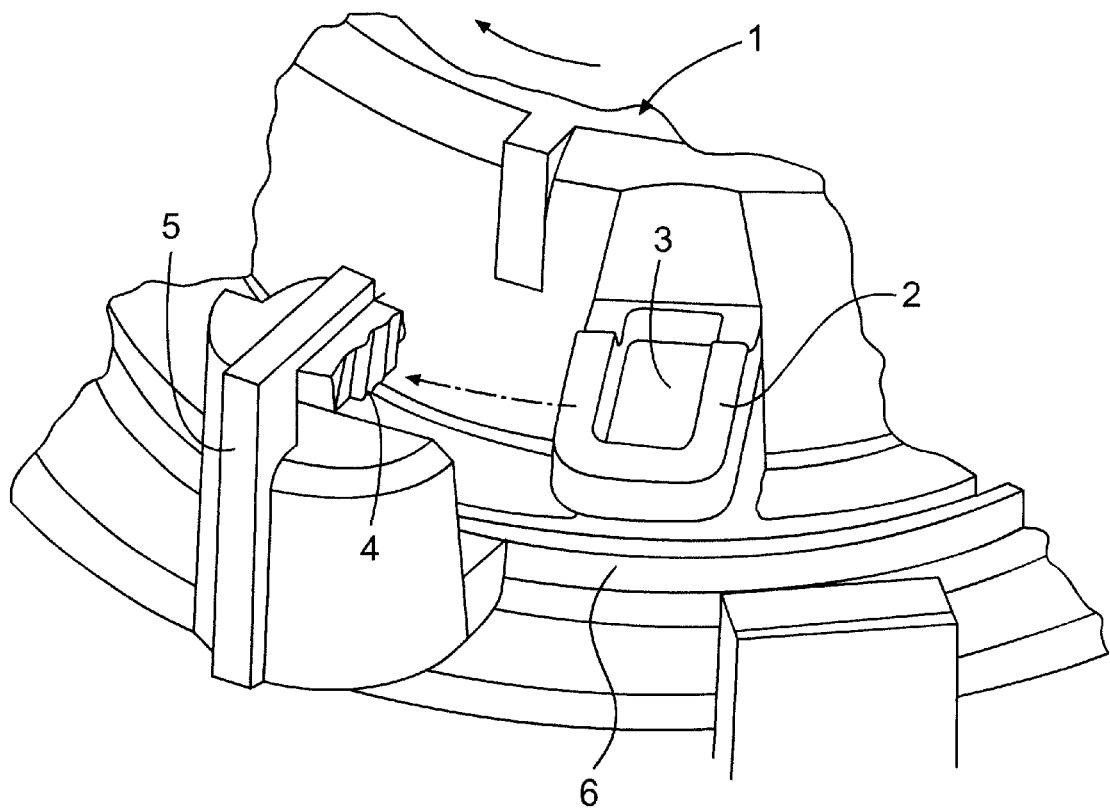
FIG. 2a shows a partial view of the plug of FIG. 2, in an unlocked position, rotatable to a locked position.

FIG. 1 depicts a cross-sectional view of a plug 1 according to the principles of the present invention, where a central part comprises a conventional plug. A fish plate 2 on each side of the central part extends radially. At the tip of each fish plate 2 is a boring or recess 3, which corresponds to a downward protuberance 4 on an underside of a hook 5 located inside a bottom 6, where plug 1 is fitted.

Plug 1 is placed outside a recess 7 which forms a lower flange 8 in base 9 for plug 1. Connected to plug 1 are electrical circuit conductors 10 for connection to a power supply circuit.

Fish plates 2 are designed to withstand bending stresses that affect them during assembly or disassembly. Therefore, fish plates 2 extend relatively widely with respect to the direction of rotation of plug 1.

Similarly, hooks 5 are designed to withstand torsion stresses that affect them during assembly or disassembly. Therefore, hooks 5 extend relatively widely with respect to the direction of rotation of plug 1.

At an outer end of each fish plate 2 a boring or recess 3 is designed to engage protuberance 4 on the corresponding hook 5. This establishes a spring lock to firmly hold plug 1.

The presently shown embodiment is only an example and is not limited to what is depicted in the drawings, as the number of fish plates and hooks can vary.

Although only an exemplary embodiment of the present invention has been described above, it will be appreciated by those skilled in the art that many changes may be made to this embodiment without departing from the principles and the spirit of the present invention.

What is claimed is:

1. A electrical plug for a power consumer comprising:
    a first portion disposed centrally in a recess in a bottom of the power consumer;
    a second flange portion disposed on a base of the power consumer proximate an edge of said recess, said first and second portions being mutually coaxially aligned about an axis perpendicular to said bottom;
    at least one of said first and second portions having electrical circuit contacts thereon for a galvanic circuit connection;
    a plurality of hooks each having a protuberance disposed on one of said first and second portions;
    a plurality of fish plates each having a recess disposed on sides of another of said first and second portions, each of said fish plates adapted to be led in under a corresponding one of said hooks;
    whereby each of said protuberances interlocks with a corresponding one of said recesses by a rotation of said first portion relative to said second portion.

2. Plug according to claim 1, characterised in that the fish plates and hooks interlock with each other.

3. Plug according to claim 1, characterised in that a number and the size of the fish plates is selected so as to withstand bending stresses during assembly and disassembly.

4. Plug according to claim 1, characterised in that a number and the size of the hooks is selected so as to withstand torsion stresses during assembly and disassembly.

5. A method of interconnecting a power consumer with a base therefor, comprising:
    providing an electrical plug connector having a first part and a second part rotatable relative to each other about a common axis, the first part having a plurality of fish plates extending outwardly from sides thereof, each having a recess, and the second part having a plurality of hooks, each having a protuberance, at least one of said first and second parts having electrical circuit contacts thereon for providing a galvanic circuit connection;

disposing one of said first and second parts in a recess in a bottom of said power consumer;

mounting another of said first and second parts to said base proximate an edge of said recess;

coaxially aligning said first and second parts;

positioning said first and second parts relative to each other such that each of said fish plates is angularly displaced relative to a corresponding one of said hooks;

rotating said first and second parts relative to each other about said common axis;

whereby each of said protuberances interlocks with a corresponding one of said recesses.

* * * * *